May 23, 1961 E. N. GOODREAU 2,985,753
CRYSTAL SAVER CIRCUIT
Filed April 10, 1959
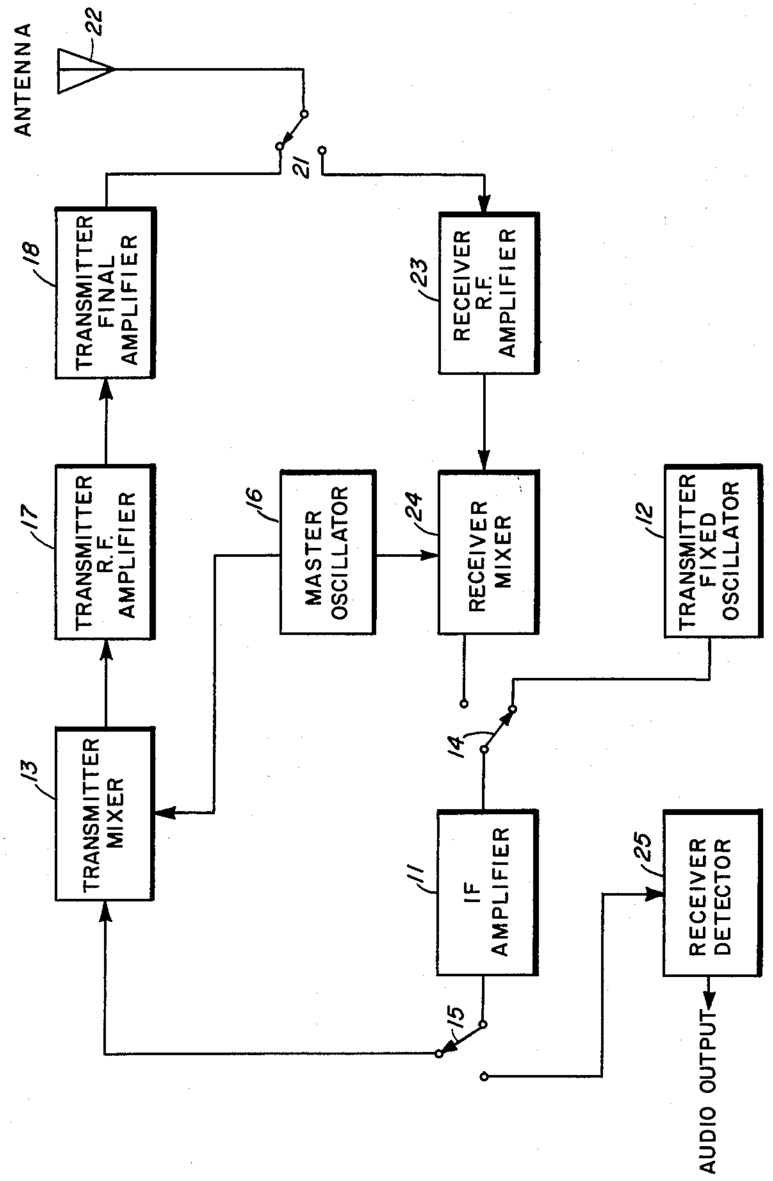
INVENTOR.
EDWARD GOODREAU
BY
ATTORNEYS United States Patent Office 2,985,753

Patented May 23, 1961

2,985,753

CRYSTAL SAVER CIRCUIT

Edward N. Goodreau, 2204 Belmont Lane, Redondo Beach, Calif.

Filed Apr. 10, 1959, Ser. No. 805,437

1 Claim. (Cl. 250—13)

This invention relates in general to a transmitter-receiver and more particularly to a novel circuit arrangement in a transmitter receiver.

In the past, conventional crystal saver circuits were employed in the transmitter section but not in the receiver section of a variable frequency receiver-transmitter. Ordinarily, the receiver I.F. was selected to operate at a fixed frequency while the variable frequency master oscillator, though designed to operate over a spread of frequencies, operates at all times at a predetermined frequency difference above the frequency to be transmitted and received. As a general rule during the "transmit" operation, the master oscillator was heterodyned with a fixed oscillator and the difference frequency was selected in the transmitter mixer output circuit.

However, great difficulty was encountered with this circuit whenever a transmitter output frequency was selected near the harmonic of the fixed oscillator. This is especially so in the lower range of transmitter frequencies as the harmonics of the fixed oscillator beat with the desired output frequency and produced tone modulation of the carrier. Normally, this undesired heterodyne is so intense to make all frequencies within several kilocycles of the desired settings completely unusable. Also, in the range of frequencies of a 100 kc. difference from the selected frequencies, undesired sidebands were produced and carried the same modulation as the desired carrier.

According to the invention, the main advantage of this crystal saver circuit is in the reduction of the number of quartz-crystals that are required to set the transmitter and receiver to a selected frequency. Previously, two crystals were needed for each selected frequency, one for transmission and one for reception. However, with this crystal saver circuit, a single crystal is used for both functions, and in the case where frequencies must be changed often, only half the usual number of crystals need be available.

It is an object of this invention to employ a single oscillator for determining the operating frequency of both the transmitter and the receiver.

Another object is to provide a means to filter out the harmonics of the operating frequencies.

It is still another object of the invention to provide a means of switching certain receiver components into the transmitter.

Other objects and many of the attendant advantages of this invention will be readily appreciated as the same becomes better understood by reference to the following detailed description when considered in connection with the accompanying drawing wherein the figure is a block diagram of the crystal saver circuit.

Referring in more detail to the figure, an intermediate frequency amplifier 11 which is a necessary part of any receiver-transmitter of this type and as a general rule is tuned to the same frequency as a fixed oscillator 12 is employed both during transmission and reception of radio frequency signals. Amplifier 11 offers several double tuned circuits which are accurately adjusted to the lower frequency of each band permitting as much overlay as possible. Since in the conventional crystal saver circuit undesired harmonics were produced during transmission by fixed oscillator 12 rather than in a transmitter mixer 13 where they appeared as a part of the transmitter mixer output, the ouput of oscillator 12 of the instant invention is fed directly through switch 14 which is in the "transmit" position into amplifier 11. This reduces any harmonic output of the oscillator circuit to a negligible amount because amplifier 11 acts as a filter for the undesirable harmonic. The output or signal of fixed oscillator 12 after passing through amplifier 11 and through a switch 15 which is also in the "transmit" position is heterodyned with the output or signal of a variable frequency master oscillator 16 to generate the transmitter output frequency in transmitter mixer 13. It is to be noted that master oscillator 16 may be either crystal controlled or of the variable frequency type.

After the transmitter output frequency has been generated by mixer 13, it passes to a transmitter R.F. amplifier 17. From there, the signal or generated frequency passes to a transmitter final amplifier 18. The signal or generated frequency next passes to switch 21, thence to an antenna 22 to be transmitted through space.

During reception, switches 14, 15, 21 are all in the "receive" position. Thus, a received signal is picked up by antenna 22 and is fed through switch 21 to a receiver R.F. amplifier 23. From amplifier 23, the received signal passes through a receiver mixer 24 where it is heterodyned with the output signal of master oscillator 16. Thence from mixer 24, the heterodyned signal passes through switch 14, amplifier 11, switch 15 to a receiver detector 25. Finally, the signal passes from detector 25 to a desirable audio output.

The receiver I.F. in this particular invention has been selected as 1 mc. and variable frequency master oscillator 16 has been designed to cover 3 mc. to 16 mc. tracking at all times 1 mc. above the frequency to be transmitted and received. During the "transmit" operation, by heterodyning master oscillator 16 with fixed oscillator 12 which incidentally operates at 1 mc., the difference frequency is selected in transmitter mixer 13 output circuit. Whereas with the conventional crystal saver circuit the undesired whistle was decreased only a minimum amount in decibels, the instant invention permits use of a band of frequencies near harmonics of fixed oscillator 12 which ordinarily would otherwise be useless.

It should be mentioned that certain other advantages are also gained by employing the I.F. amplifier in the above set forth manner. For instance, since several stages of amplification are normally available in the I.F. section, the fixed oscillator output can be reduced to a very low level, usually to the point of minimum harmonic output and maximum frequency stability. Also, amplification of the I.F. amplifier ordinarily can be changed by application of a bias voltage to the A.G.C. circuit thereby providing an easy method of controlling the amount of fixed frequency injection to transmitter mixer 13. This may be considered desirable in some cases where the master oscillator output varies with frequency, or where the ratio of fixed frequency to the master oscillator injection varies with frequency.

Obviously many modifications and variations of the present invention are possible in the light of the above teachings. It is therefore to be understood that within the scope of the appended claim the invention may be practiced otherwise than as specifically described.

What is claimed is:

A transmitter-receiver crystal saver circuit comprising in combination a transmitter section for propagating radio frequency signals comprising a fixed oscillator which produces a signal of a first frequency, an intermediate frequency amplifier directly receiving the output of the fixed oscillator and tuned to the same frequency as the said fixed oscillator for amplifying said first frequency and filtering out harmonics thereof, a master oscillator for producing a signal of a second frequency, a transmitter mixer operatively connected to said intermediate frequency amplifier and said master oscillator for heterodyning the output of the intermediate frequency amplifier and master oscillator to produce a signal of a third frequency, and amplifier means for amplifying said third frequency, and antenna means for radiating said signal into space; and a receiver section comprising a receiver mixer for heterodyning a received signal and a signal from said master oscillator and producing an intermediate frequency signal, switching means having a first position for switching said intermediate frequency amplifier into the transmitter section when transmitting and a second position for switching said intermediate frequency amplifier into the receiving section when receiving so that said intermediate frequency amplifier is operatively connected to the output of said receiver mixer when said switch is in the second position for amplifying said intermediate frequency signal produced by said receiver mixer, and a receiver detector operatively connected to the output of said intermediate frequency amplifier when said switch is in the second position for producing an audio output.

References Cited in the file of this patent

UNITED STATES PATENTS 2,654,832 Robinson ---------------- Oct. 6, 1953